United States Patent [19]

Shibata et al.

[11] Patent Number: 5,561,453
[45] Date of Patent: Oct. 1, 1996

[54] CUSTOM PROFILED FLEXIBLE CONDUIT SYSTEM

[75] Inventors: Alan Shibata, Camas; Eric L. Ahlvin, Vancouver, both of Wash.

[73] Assignee: Hewlett-Packard Company, Palo Alto, Calif.

[21] Appl. No.: 585,543

[22] Filed: Jan. 11, 1996

Related U.S. Application Data

[63] Continuation of Ser. No. 221,350, Mar. 31, 1994, abandoned.

[51] Int. Cl.$^6$ .............................. B41J 2/175; F15D 1/14; F16L 11/22
[52] U.S. Cl. .............................. 347/85; 138/45; 138/118; 138/119
[58] Field of Search .............................. 347/84, 85, 86, 347/87; 138/45, 111, 118, 119; 251/7

[56] References Cited

U.S. PATENT DOCUMENTS

| | | |
|---|---|---|
| 2,123,781 | 7/1938 | Huber . |
| 2,587,949 | 3/1952 | Zodtner . |
| 2,987,004 | 6/1961 | Murray . |
| 3,438,059 | 4/1969 | Highly, Jr. . |
| 4,131,399 | 12/1978 | Calvet .............................. 417/477 |
| 4,215,354 | 7/1980 | Larson .............................. 346/140 R |
| 4,268,026 | 5/1981 | Kojima .............................. 271/121 |
| 4,333,088 | 6/1982 | Diggins .............................. 346/140 R |
| 4,368,478 | 1/1983 | Koto .............................. 346/140 R |
| 4,382,707 | 5/1983 | Anderka .............................. 401/198 |
| 4,417,259 | 11/1983 | Maeda .............................. 346/140 R |
| 4,540,997 | 9/1985 | Biggs et al. .............................. 346/140 R |
| 4,549,191 | 10/1985 | Fukachi et al. .............................. 346/140 R |
| 4,671,692 | 6/1987 | Inaba .............................. 401/199 |
| 4,689,641 | 8/1987 | Scardovi et al. .............................. 346/140 R |
| 4,708,506 | 11/1987 | Herrnring .............................. 401/151 |
| 4,734,718 | 3/1988 | Iwagami et al. .............................. 346/140 R |
| 4,929,969 | 5/1990 | Morris .............................. 346/140 R |
| 4,931,811 | 6/1990 | Cowger et al. .............................. 346/140 R |
| 4,947,187 | 8/1990 | Iwagami .............................. 346/1.1 |
| 5,019,839 | 5/1991 | Watanabe et al. .............................. 346/134 |
| 5,025,271 | 6/1991 | Baker et al. .............................. 346/140 R |
| 5,027,134 | 6/1991 | Harmon et al. .............................. 346/140 R |
| 5,148,185 | 9/1992 | Abe et al. .............................. 347/85 |
| 5,149,077 | 9/1992 | Martin et al. .............................. 271/18.3 |
| 5,188,350 | 2/1993 | Hayashi .............................. 271/114 |
| 5,309,180 | 5/1994 | Uchido .............................. 346/140 R |

FOREIGN PATENT DOCUMENTS

| | | | |
|---|---|---|---|
| 0476317 | 3/1992 | European Pat. Off. | ......... F16L 11/12 |
| 2668574 | 4/1992 | France | .............................. F16L 11/12 |
| 935166 | 11/1955 | Germany | .............................. 47 F 4 |
| 120462 | 7/1984 | Japan . | |
| 60-243386 | 12/1985 | Japan . | |
| 193859 | 8/1986 | Japan . | |
| 1134041 | 11/1968 | United Kingdom | ............ F16L 11/12 |
| WO84/04574 | 11/1984 | WIPO | .............................. F16L 11/12 |
| WO90/01654 | 2/1990 | WIPO | .............................. F16L 11/12 |
| WO92/19900 | 11/1992 | WIPO | .............................. F16L 11/12 |

*Primary Examiner*—Benjamin R. Fuller
*Assistant Examiner*—Craig A. Hallacher
*Attorney, Agent, or Firm*—Flory L. Martin

[57] ABSTRACT

A custom profiled flexible conduit system conveys a fluid therethrough between two locations, which may be moving relative to one another. The conduit profile includes a wall with a nonuniform thickness selected to control a diffusion rate of the fluid when conveyed through, or when standing within the conduit. The conduit profile defines a main chamber and optional auxiliary chambers. During a collapse of the conduit, caused by a kink for instance, restricted fluid flow may be sustained through a constricted passageway formed in the main chamber, through the auxiliary chambers, or both. The profile may include a protuberance into the main chamber to maintain flow during collapse. The profile may also be customized to minimize the bend radius before collapse of the conduit, and to promote bending in a particular direction. A method is also provided of conveying fluid between two locations.

22 Claims, 3 Drawing Sheets

CUSTOM PROFILED FLEXIBLE CONDUIT SYSTEM

CROSS REFERENCE TO RELATED APPLICATION

This is a continuation of application Ser. No. 08/221350 filed on Mar. 31, 1994, now abandoned.

BACKGROUND OF THE INVENTION

The present invention relates generally to a conduit system for conveying a fluid therethrough, and more particularly to a system and method of controlling diffusion of the fluid through the conduit, such as may be used in a hardcopy printing mechanism for conveying ink from a reservoir to a printhead.

Whenever there is a need for transporting a fluid, such as a liquid, suspended particulate, or gaseous material, through a conduit, such as a channel or tube, there are several factors which are of concern. One factor involves the amount of fluid which will be lost due to diffusion through the conduit walls. Another factor in a flexible conduit system, which has one end of the conduit moving relative to the other end, involves the amount of space required for the conduit to flex during movement. An additional factor concerns how tightly the conduit may be bent during this movement before its walls collapse. This maximum degree of bending before the conduit walls collapse is a characteristic of conduit referred to as the "bend radius."

For example, FIG. 9 shows a perspective view of a sectioned prior art flexible tube A, having a round radial cross sectional profile. The tube A has concentric inside and outside diameters, $D_i$ and $D_o$, respectively. The tube A is shown as being bent to its minimum bend radius R' about a center point C'. For round tubing, the bend radius R' is dependent upon the relationship between the inside and outside diameters $D_i$, $D_o$.

Thus, there are a variety of competing concerns to balance when using the prior art round tubing A (FIG. 9) to convey a fluid between two locations, particularly when one location is moving relative to the other. One example of a need for a moving flexible conduit is an "off-axis" inkjet printing mechanism, such as that used in plotters, facsimile machines and inkjet printers, which have a remote reservoir for storing a colorant, referred to generally herein as "ink." Inkjet printing mechanisms typically have a printhead which is propelled from side to side across a print medium, such as paper, with the printhead being controlled to selectively deposit ink in a desired pattern on the page. While some inkjet print mechanisms carry an ink cartridge along with the printhead back and forth across the sheet, an "off-axis" system propels only the printhead across the printing region, with the ink supply being stored in a stationary reservoir. Typically, a flexible conduit is used to convey the ink from the reservoir to the printhead.

These off-axis printing mechanisms may be in continual use, but often they are used only intermittently. While sitting during periods of inactivity, the ink remaining in the tubing from the last use is prone to diffusion through the tube walls. Worse yet, only certain components of the ink may diffuse through the tube walls, leaving a composition in the tubing which is far different than the original ink formulation.

For instance, alcohol-based inks are prone to alcohol diffusion through the tube walls. While lack of the alcohol component will not necessarily cause these inks to dry out and clog the tubing, the ink which eventually reaches the print medium often dries slower than optimum, and it is often subject to color bleeding. To address this problem, some inkjet printers purge the entire ink conduit each time the printer is activated. This solution can be particularly wasteful for some light-duty users, since nearly an entire month's supply of ink may be stored in the tubing.

One conventional manner of addressing the diffusion problem is to increase the wall thickness of the conduit. Unfortunately, as the wall thickness increases, the bend radius also increases. A larger bend radius requires additional space, so often the overall size of the device housing the conduit must be larger, which increases material and shipping costs. Furthermore, a physically larger unit impedes the goal of providing more compact equipment with a smaller "footprint," i.e., the physical area occupied by the equipment in the workplace or home environment.

Another manner of minimizing diffusion is to add diffusion inhibitors to the tubing material. These anti-diffusion additives tighten the molecular bonds of the conduit material, which unfortunately has the side effect of increasing the stiffness of the tubing. Stiffer tubing requires more force to bend. To handle these additional forces, portions of the equipment which house the tubing must often be upgraded. For instance, in an inkjet printing mechanism, a stiffer tube requires heavier printhead carriage bearings, a more powerful motor to propel the carriage across a page, and integrated circuit chips with higher voltage ratings. A stiffer tube also requires a larger bend radius R'. A larger bend radius, whether caused by thickening the tube walls, or adding diffusion inhibitors to the tube material, requires the conduit be housed in a physically larger device.

Thus, the earlier flexible conduit systems have inadequately addressed the competing needs of minimizing diffusion and minimizing the bend radius, as illustrated above with respect to an inkjet printer. The solutions used in the past have often minimized the diffusion rate at the expense of increasing the bend radius, which increases the overall size of the resulting equipment. Larger equipment is often heavier and more costly to manufacture and ship, as well as being undesirable to some customers who prefer more compact equipment with a smaller footprint.

SUMMARY OF THE INVENTION

According to one aspect of the present invention, a flexible conduit is provided for conducting a fluid therethrough. The conduit comprises a body of a resilient material having a wall with an outer surface and an inner surface. Preferably, the inner surface is formed to define an elongate chamber. The body also defines first and second portals in communication with the chamber for transporting the fluid therethrough. The conduit body is also configured with at least one of the inner and outer surfaces having a noncircular sectional profile, and with and a first portion of the wall having a substantially uniform thickness.

According to an illustrated embodiment, a inkjet printing mechanism is provided comprising a chassis, a print medium handling system, a printhead carriage system and a reservoir. The printing mechanism also includes a flexible conduit for conveying ink from the reservoir to a printhead mounted on the carriage system.

According to another aspect of the present invention, a method is provided of conveying a fluid between two locations. The method includes the steps of coupling a flexible conduit for fluid communication between the two locations, and at varying intervals, transporting the fluid between these two locations through the conduit. In a selecting step, the conduit is selected to have a wall with a nonuniform thickness selected to control a diffusion rate of the fluid during the transporting step and between occurrences of the transporting step.

In an illustrated embodiment of the method, there is relative movement between the two locations provided by a moving step, and the method further includes the step of bending the conduit during the moving step. In another illustrated embodiment, the two locations comprise a reservoir and a printhead of an inkjet printing mechanism, and the fluid comprises an ink. The transporting step comprises, transporting the ink between the reservoir and the printhead through the conduit, and the method further includes the step of moving the printhead relative to the reservoir.

An overall goal of the present invention is to provide a flexible conduit system and a method which lower the diffusion rate of a fluid through the conduit wall, without increasing the bend radius of the conduit over that encountered using the earlier round tubing.

Another goal of the present invention is to provide an apparatus with a custom profiled flexible conduit system of the present invention so the resulting apparatus is more compact, lighter weight, and more economical to manufacture and ship than equipment using the earlier round tubing.

DETAILED DESCRIPTION OF THE PREFERRED EMBODIMENTS

Figure 1:
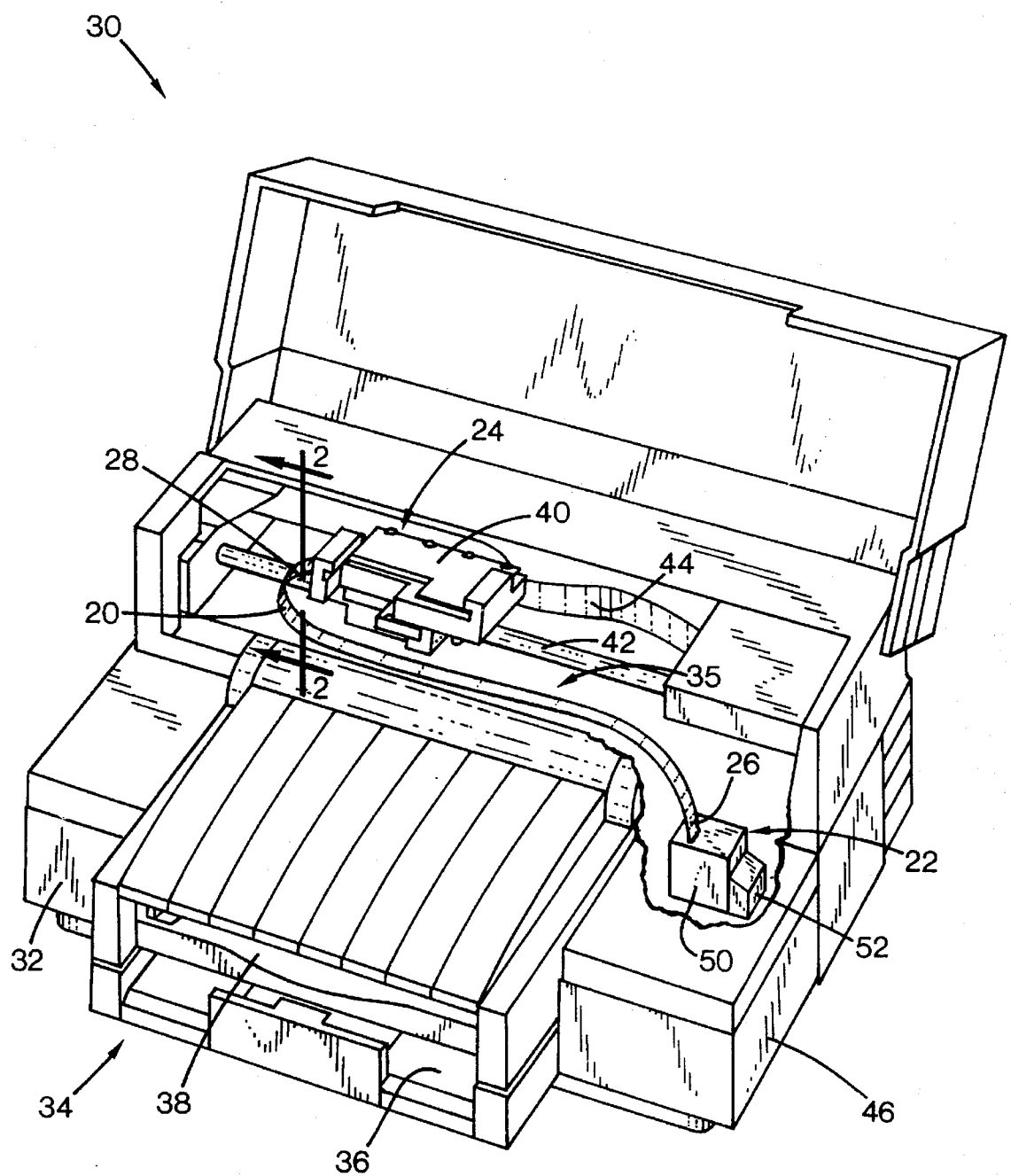
FIG. 1 is a partially cut away perspective view of one form of an apparatus, here an inkjet printer, using one form of the customized profiled flexible conduit system of the present invention.
Figure 2:
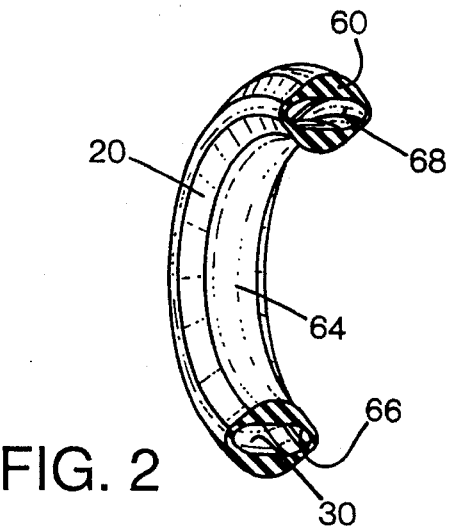
FIG. 2 is an enlarged sectional perspective view taken along lines 2—2 of FIG. 1.
Figure 3:
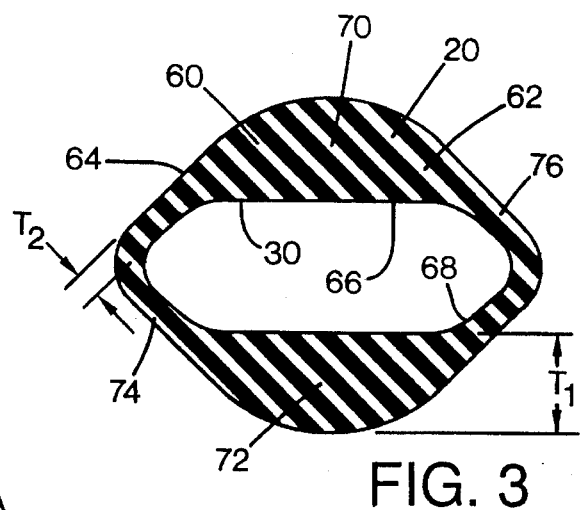
FIG. 3 is an enlarged radial cross sectional view of the conduit of FIG. 2.

FIGS. 1–3 illustrate an embodiment of a flexible conduit 20, constructed in accordance with the present invention, which may be used to convey or transport a fluid therethrough from a first location 22 to a second location 24. The conduit or tube 20 has a first end 26 for receiving fluid at the first location 22, and a second end 28 for delivering fluid to the second location 26. It is apparent that the conduit system 20 may be used in a variety of different applications requiring a flexible conduit to couple together two remote locations. In particular, the conduit 20 is well suited for applications having the two locations 22, 24 moving relative to one another. For example, the conduit 20 may be useful in hydraulic applications, or various robotic applications requiring fluid conveyance, such as chemical sprays, paint sprays, coolant or lubricating systems, and the like.

One particularly useful implementation for discussing the characteristics of conduit 20 is an inkjet printing mechanism, here illustrated as an inkjet printer assembly 30 constructed in accordance with the present invention. While it is apparent that the printing mechanism components may vary from model to model, the illustrated inkjet printer 30 has a chassis 32 and a print media handling system 34. The media handling system 34 includes a feed tray 36 for supplying: a print medium, such as paper, card stock, transparencies, mylar, foils, etc., to the printer 30. The media handling system 34 has a series of rollers (not shown) for delivering the sheets from the feed tray 36, into a print zone 35, and then into an output tray 38.

In the illustrated embodiment, the second location 24 comprises a printhead and carriage assembly 40 which may be driven from side to side across the print zone 35 along a guide rod 42 by, for example, by a conventional drive belt/pulley and motor assembly (not shown). The printhead 40 may include a series of nozzles constructed in a conventional manner to selectively deposit one or more ink droplets on the print medium in accordance with instructions received via a conductor strip 44 from a printer controller 46, located within chassis 32, for instance at the location shown in FIG. 1. The controller 46 generally receives instructions from a computer (not shown), such as a personal computer. Personal computers, their input devices such as a keyboard and/or a mouse device (not shown), and computer monitors are all well known to those skilled in the art.

In the illustrated embodiment, the first fluid location 22 comprises an ink reservoir 50 which stores a supply of ink. A variety of different systems may be implemented to propel the ink from the reservoir 50 to the printhead 40. For example, a piston actuator assembly 52 extends into the reservoir 50 to force ink into the conduit first end 26. Other methods of urging the ink through tube 20 include the use of capillary action, a gravity feed system provided by mounting the reservoir 50 at a location (not shown) higher than the printhead 40, or pumping action, for instance provided by a peristaltic pump (not shown).

As the printhead 40 is propelled back and forth across the print zone 35, it is apparent that the conduit 20 must flex and bend as the second end 28 moves with the printhead relative to the stationary first end 26 at reservoir 50. There are limitations to the degree of bending that a tube, can withstand before collapsing. These limitations depend upon the type of material selected and the cross sectional profile of the particular tube. The conduit 20 may be constructed from a variety of different elastomers and plastics, with varying material properties.

After the conduit material has been selected, then the radial cross sectional shape (e.g. FIG. 3) of the conduit 20 may be custom profiled. For example, when selecting a tubing size for a particular application, there are several factors to be considered, including the bend radius, diffusion rate, tube length, input pressure, required flow rate, and the ease of manufacturing or procuring the conduit, as well as the ease of assembly in the final apparatus. The two factors of interest here are the bend radius and the diffusion rate, both of which may be affected by selecting; the cross sectional profile of conduit 20.

Referring to the prior art tube A in FIG. 9, one analysis scheme for approximating the bend radius in this circular tube A analyzes the equations for bending a beam as follows:

$$r = EI \div M$$

where:
- r=radius of curvature,
- E=modulus of elasticity,
- M=bending moment, and
- I=bending moment of inertia.

While the formula above is intending for study the small deflections of steel bars, it implies that deflections are within the linear range of the stress-strain curve, so the modulus of elasticity E is constant. Thus, the profile of the beam does not change shape throughout the bend. Unfortunately, the plastic modulus is not necessarily constant during a bend, and the profile of flexible tubing does change shape when bent. Thus, while the equation above may be a good first order approximation for a bending radius, it may be more valuable to analyze the bending radius by assuming it is somewhat proportional to the bending moment of inertia.

In this analysis, using either an approximation for the bending radius, or a tube sample of a desired material and a selected bend radius, the bending moment of inertia may be calculated. The resulting value may be used as a basis for creating different size tubes which each have substantially the same bend radius. Referring to FIG. 9, the moment of inertia I for the prior art circular tube A is:

$$I = (\pi \div 64)(D_o^4 - D_i^4)$$

From the moment of inertia equation, it is apparent that small changes to the outside diameter Do have a large impact on the moment of inertia I. Regarding the inside diameter Di, the relative size of Di with respect to the outside diameter Do determines the degree of influence which the inside diameter has on the moment of inertia I, as well as the resulting wall thickness.

Earlier tube design philosophies concentrated on minimizing kinking of the tube during bending, since the uncontrolled collapse of the tube produced by a kink typically stopped or severally inhibited fluid flow. The cylindrical or round profile tube A (FIG. 9) is the most structurally stable and kink-resistant profile, and it readily bends in any direction. To address diffusion problems in round tubing, wall thickness were increased or anti-diffusion components were added to the tubular material, both of which increased the bending radius, as discussed above in the Background section.

Figure 4:
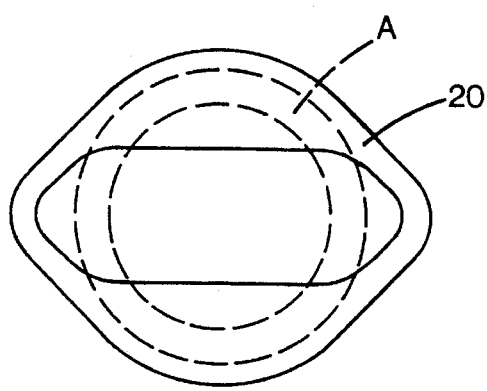
FIG. 4 is a line drawing of the conduit section of FIG. 3 shown in solid lines, with the radial cross section of the prior art tubing of FIG. 9 superimposed in dashed lines.

To address the dual problems of preventing diffusion and minimizing the bend radius, the first illustrated embodiment of conduit 20 is shown in FIGS. 2–4. The conduit 20 includes a body 60 of an elastomer, plastic, or other resilient flexible material. The body 60 is formed to have a continuous wall 62 bounded by an outer surface 64 and an inner surface 66, at least one of which is preferably not circular in radial cross section (e.g. FIG. 3). The inner surface 66 is formed to define an elongate chamber 68 for conveying a fluid therethrough from the first end 26 to the second end 28.

The wall 62 of the illustrated conduit 20 has a thickness which is nonuniform in radial cross section. For example, the wall 62 has two thick portions or sections 70 and 72 of a thickness $T_1$, and two thin portions or sections 74 and 76, each having a thickness of $T_2$ which is less than the thickness $T_1$. Preferably, the wall 62 has one section of a uniform thickness, such as portions of the thin sections 74, 76, and at least one other section having a thickness other than the uniform thickness, here, sections 70 and 72. Preferably, the majority of the periphery of conduit 20 is surrounded by the thick portions 70 and 72, which lower the diffusion by virtue of their greater wall thicknesses.

The thin portions 74 and 76 of conduit 20 preferably occupy a smaller portion of the periphery, for example on the order of 10°–90° of arc. If the wall thickness of the thinner portions 74, 76 is less than that of a comparable flow-rate round tube A (FIG. 9), then diffusion through the thin portions may be higher than in the conventional round tube. FIG. 4 shows an overlay of the conduit 20 and the conventional round tubing A (dashed lines) to compare the relative size, wall thicknesses, and curvature of these conduits. However, by selecting a smaller arcuate span tier the thin sections than the thicker sections, the overall diffusion rate for the tube profile 20 is lowered beyond the minimum diffusion rate of a comparable conventional circular tube A. Moreover, the thinner sections 74, 76 are more flexible than the thick sections 70, 72 so the conduit 20 is inclined to bend in a controlled direction, such as illustrated in FIG. 2, with the thick sections 70, 72 oriented substantially concentric to one another.

Figure 5:
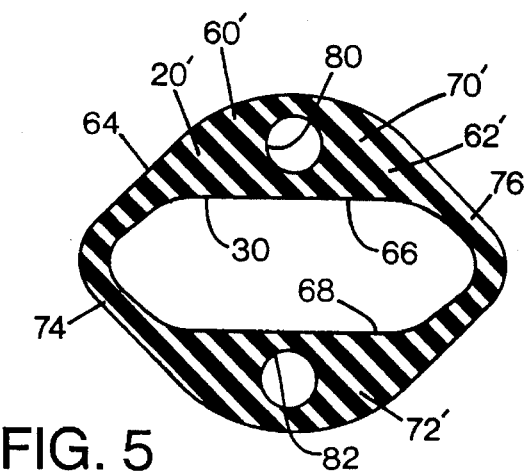
FIG. 5 is a enlarged radial cross sectional view of one form of an alternate embodiment to that shown in FIG. 3.
Figure 6:
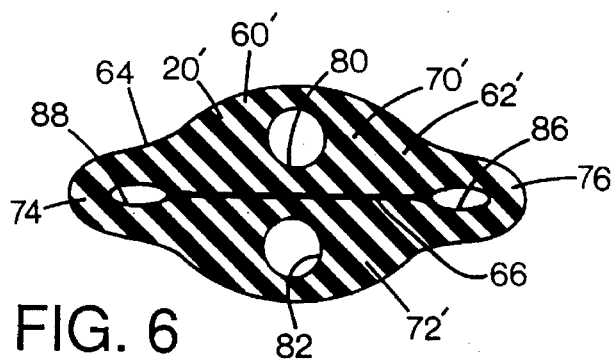
FIG. 6 is a sectional view of the conduit of FIG. 5, shown in a collapsed state.

An alternative conduit profile is shown as conduit 20' in FIGS. 5 and 6. The conduit 20' may be constructed as described above for conduit 20, with the addition of one or more auxiliary elongate chambers defined by wall 62" of body 60' as extending substantially parallel to the main chamber 68. For example, conduit 20' has two auxiliary chambers 80 and 82 extending through the respective thicker sections 70' and 72'. The chambers 80, 82 preferably are in fluid communication with the printhead 40 and the reservoir 50.

Under collapsed conditions when the conduit 20' is kinked, as shown in FIG. 6, the main chamber 68 substantially collapses in a controlled manner to restrict flow, with minimal flow being provided through the constricted remaining passageways 86 and 88. The illustrated collapse is controlled in a predictable direction, that is, the thin portions 74, 76 flex far more than the thick sections, 70', 72' during the collapse. Through selection of the conduit material and profile shape, the degree of flow restriction (or the amount of flow sustained) during the collapse may also be controlled. Both the collapse direction and degree of flow impedance concepts are referred to generally herein, either collectively or individually, by the terms "controlled collapse" or "controlled bending."

It is apparent that the collapse of the conduit 20 may also be controlled as shown in FIG. 6 for conduit 20', with the collapse profile still retaining a large enough opening through passageways (86, 88) to sustain fluid flow therethrough, albeit an impeded flow. Other schemes may be used to maintain a smaller channel through the conduit 20 when constricted by a kink. For example, a portion of sections of 74, 76 may be thicker (not shown) and resist collapse more than the remainder of sections 74, 76. While the profile of conduit 20 may be altered from that shown in FIG. 3 to make passageways 84 and 86 larger, in conduit 20', the auxiliary chambers 80 and 82 may be sized to maintain sufficient flow through the conduit during a brief kinking incident.

Figure 7:
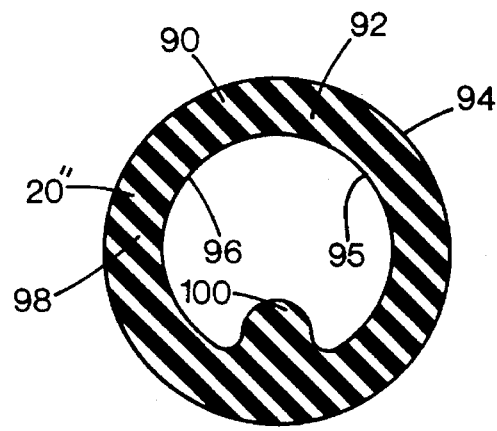
FIG. 7 is an enlarged radial cross sectional view of one form of an alternate embodiment of the conduit system or FIG. 1.
Figure 8:
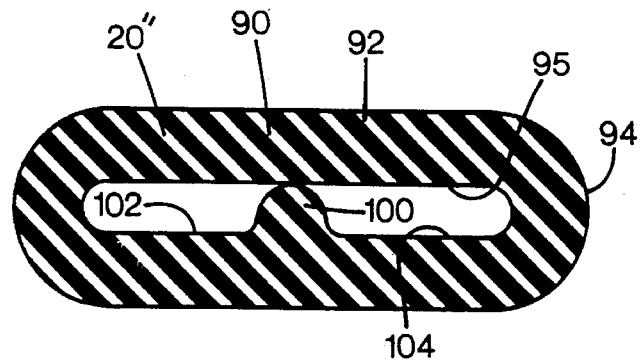
FIG. 8 is a sectional view of the conduit of FIG. 7, shown in a collapsed state.

Referring to FIGS. 7–8, another alternate embodiment of a conduit 20" constructed in accordance with the present invention is shown in radial cross section as including a body 90 formed as wall 92 having an outer surface 94 and an inner surface 95. The inner surface 95 is configured to define an elongate chamber 96 which extends from the first end 26 to the second end 28 of the conduit (see FIG. 1). The conduit 20' has a thin wall portion 98 and a thick wall portion, illustrated as a protuberance or rib 100 extending into an otherwise cylindrical main chamber 96. In the illustrated embodiment, the thin portion 98 extends approximately 330° around the radial periphery of chamber 96, with the thicker rib portion 100 extending from 10°–50°, but preferably around 30°. The outer surface 94 is substantially circular in cross section in the illustrated embodiment.

As shown in FIG. 8, the rib 100 prevents total blockage of conduit 20" during collapse. The rib 100 also promotes a controlled collapse in the manner shown, with the main chamber 96 decreasing in cross sectional area until two minor chamber areas 102 and 104 are established and held open by rib 100. It is apparent that an auxiliary chamber (not shown), such as chambers 80 and 82 (FIGS. 5 and 6), may also be added, for instance within the area of rib 100. It is apparent that the body 90 may be formed with other ribs (not shown) extending into the otherwise circular chamber 96, to control the collapse of conduit 20".

Moreover, it is apparent that the profile of the conduits 20, 20', 20" (FIGS. 5, 3, 7) may either be constant over the entire length of the conduit, or the profile may vary. For example, it may be advantageous to vary the wall thickness of the conduits to enhance bendability in certain areas, while a thicker wall radius may be useful in sections that remain relatively straight during use, so diffusion is minimized. However for ease of manufacture, it may be preferable to maintain a constant profile over the entire length of the conduit, so no specialized severing of the conduit lengths or specialized assembly (e.g. custom profile near one end 28, but circular profile at end 26) is required. For other implementations, such specialized assembly of a varying profiled conduit may be cost effective.

Figure 9:
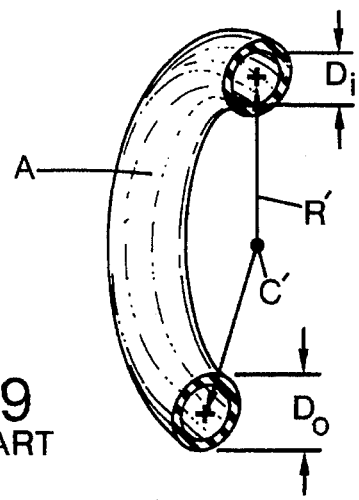
FIG. 9 is an elevational sectional perspective view of a prior art round tubing.

Another deficiency of the prior art tubing A of FIG. 9 is the concentrated stress it sustains at the bend point, particularly when collapsed. Thus, it is very predictable where failure will occur in tube A, specifically, at the bend point. In contrast, the illustrated custom profiled conduit distributes stress over the entire bend region. This stress distribution is another concept embodied within the term "controlled bending" or "controlled collapse" as used herein.

It is apparent that by using the custom profiled flexible conduit system illustrated herein, a method may also be implemented for conveying fluid between two locations, such as from a reservoir to a printhead, which advantageously controls a diffusion rate of the ink or other fluid during transportation. In a first step, the conduit 20, 20', or 20" is coupled for fluid communication between the two locations, such as reservoir 50 and printhead 40. At varying intervals, the ink is transported through the conduit as needed for printing, purging or cleaning of the printhead, etc. between the reservoir 50 and the printhead 40.

In a selecting step, the conduit may be selected as described above, with the wall having a thickness which is nonuniform in radial cross section, such as shown in FIGS. 3, 5, and 7. The wall thickness and profile of the conduit may be selected as described above to control the bend radius, flow during normal conditions and during collapse, as well as the direction of bending during printing. This profile nonuniformity is also selected to control the diffusion rate of the ink or other fluid during the transporting step, and between occurrences of the transporting step. In the illustrated embodiment, this time "between occurrences of the transporting step" may vary from a manner of seconds when the printhead 40 is at rest, to extended periods of time on the order of days, months or longer when the printer 30 is not in use.

At varying intervals, the method may also include the step of collapsing a portion of the main chamber 68, 96, such as when the printhead 40 reaches its most distal position from the reservoir 50 (to the far left along guide rod 42 in FIG. 1). In a controlling step, this collapsing is controlled to continue transporting ink through the conduit, such as through the auxiliary chambers 80 and 82, the remaining open channels 86 and 88 (FIG. 6), or the remaining channels 102, and 104 (FIG. 8). Through selection of the tube profile, bending stresses generated in the conduit during movement of the ends 26, 28 relative one another, such as during printing, may be substantially evenly distributed over a length of the tubular member, rather than concentrated in a single location as experienced with the prior art tube A of FIG. 9.

In implementing the method and conduit system of the present invention, the custom profiled flexible conduit advantageously reduces diffusion of the fluid through the tube wall, while also minimizing bend radius. Thus, fluid is saved so operation is more economical. The direction of bending is controlled and predictable through the custom profile, and flow may be maintained during an occasional kinking of the conduit. Decreasing the bend radius for a given flow rate over comparable round tubing, allows for a smaller apparatus to be designed. In general, smaller products are more economical, in terms of manufacture and shipping, as well as more compact and desirable to the ultimate consumer.

We claim:

1. An inkjet printing mechanism for printing a selected image with ink on a print medium, comprising:

a chassis;

a print medium handling system housed in the chassis for supplying the print medium to a printing zone;

a printhead carriage system which propels a printhead across the printing zone to selectively deposit ink on the print medium in response to a control signal;

a reservoir for storing a supply of ink; and a flexible conduit coupled to convey the ink from the reservoir to the printhead, the conduit comprising a body having a wall, with the wall defining a main elongate chamber in communication with the reservoir and the printhead when the body is in an uncompressed state, the wall having a first section of a substantially uniform thickness and a second section of a thickness other than the uniform thickness, and with the body also defining an auxiliary elongate chamber extending through the body when the body is in the uncompressed state, with the auxiliary elongate chamber being isolated from the main elongate chamber when the body is in the uncompressed state.

2. An inkjet printing mechanism according to claim 1, wherein the body wall has an outer surface and an inner surface that defines the main elongate chamber, with at least one of the inner and outer surfaces having a non-circular radial cross sectional profile.

3. An inkjet printing mechanism according to claim 1, wherein the wall thickness of the second section is substantially constant through the body.

4. An inkjet printing mechanism according to claim 1, wherein the wall thickness comprises a thin section of a first thickness and a thick section of a second thickness greater than the first thickness.

5. An inkjet printing mechanism according to claim 4, wherein the body has two of said thin sections and two of said thick sections, with the thin sections separated from one another by the thick sections.

6. An inkjet printing mechanism according to claim 5, wherein the first sections each span an arc of substantially the same distance.

7. An inkjet printing mechanism according to claim 1, wherein the body also defines a second auxiliary elongate chamber extending through the body when the body is in the uncompressed state, with the second auxiliary elongate chamber being isolated from the main elongate chamber when the body is in the uncompressed state.

8. An inkjet printing mechanism according to claim 1, wherein the wall has a single second section with a thickness greater than the uniform thickness.

9. A method of conveying a fluid between two locations, comprising the steps of:

coupling a flexible conduit having a body, which in an uncompressed state, defines a main elongate chamber and an auxiliary chamber for communicating fluid between the two locations, with the auxiliary elongate chamber being isolated from the main elongate chamber when the body is in the uncompressed state;

transporting the fluid between the two locations through the main elongate chamber of the conduit at varying intervals;

selecting the conduit to have a wall with a nonuniform thickness selected to control a diffusion rate of the fluid during the transporting step and between occurrences of the transporting step;

occasionally collapsing at least a portion of the main elongate chamber during said transporting step; and wherein the transporting step further comprises transporting the fluid through the auxiliary chamber during occurrences the collapsing step.

10. A method according to claim 9, wherein the two locations comprise a first location and a second location, and wherein the method further includes the steps of:

moving the first location relative to the second location; and bending the conduit during the moving step.

11. A method according to claim 10, further including the steps:

generating a bending stress in the conduit during the bending step; and distributing the bending stress in a substantially even concentration over a portion of the conduit which is undergoing bending.

12. A method according to claim 11, further including the step of controlling the collapsing step to continue transporting the fluid through the main elongate chamber of the conduit during the collapsing step.

13. A method according to claim 10 wherein the selecting step comprises selecting the conduit wall thickness nonuniformity to control a bend radius of the conduit during the bending step.

14. A method according to claim 9, wherein:

the selecting step comprises selecting the conduit to have a body of a resilient material, the body having a wall with an outer surface and an inner surface, with at least one of the inner and outer surfaces having a non-circular radial cross sectional profile; and the transporting step further comprises transporting the fluid through the main elongate chamber of the conduit during the collapsing step.

15. A method according to claim 9, wherein:

the two locations comprise a reservoir and a printhead of an inkjet printing mechanism;

the fluid comprises an ink;

the transporting step comprises, transporting the ink between the reservoir and the printhead through the conduit; and the method further includes the step of moving the printhead relative to the reservoir.

16. A flexible conduit for conducting a fluid therethrough, comprising a body of a resilient material having a wall with an outer surface and an inner surface, the inner surface formed to define a main elongate chamber when the body is in an uncompressed state, the body defining first and second portals in communication with the main elongate chamber for transporting the fluid through the main elongate chamber, with the body also defining an auxiliary elongate chamber extending through the body when the body is in the uncompressed state, with the auxiliary elongate chamber being isolated from the main elongate chamber when the body is in the uncompressed state, with at least one of the inner surface and the outer surface having a non-circular sectional profile and a first portion of the wall having a substantially uniform thickness.

17. A flexible conduit according to claim 16, wherein the wall has a second portion with a nonuniform thickness.

18. A tube according to claim 17, wherein the nonuniform wall thickness is substantially constant through the body between the first and second portals.

19. A flexible conduit according to claim 16, wherein the wall thickness comprises a thin section of a first thickness and a thick section of a second thickness greater than the first thickness.

20. A flexible conduit according to claim 19, wherein the nonuniform wall thickness comprises two opposing thin sections separated from one another by two opposing thick sections.

21. A tube according to claim 20, wherein the two opposing thin sections each span an arc of substantially the same distance.

22. A tube according to claim 16, wherein:

the body also defines a second auxiliary elongate chamber extending through the body when the body is in the uncompressed state, with the second auxiliary elongate chamber being isolated from the main elongate chamber when the body is in the uncompressed state; and the body defines third and fourth portals in communication with the first auxiliary chamber, and fifth and sixth portals in communication with the second auxiliary chamber for transporting a fluid therethrough.

* * * * *